T. E. TURNER.
BALING PRESS.
APPLICATION FILED JULY 23, 1915.
1,187,944.
Patented June 20, 1916.
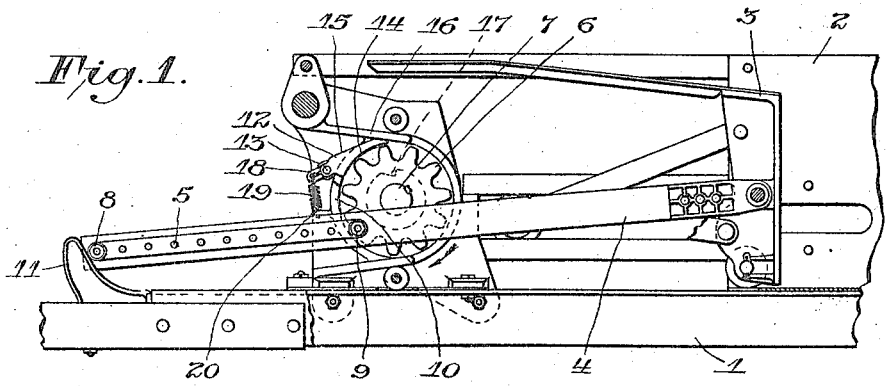
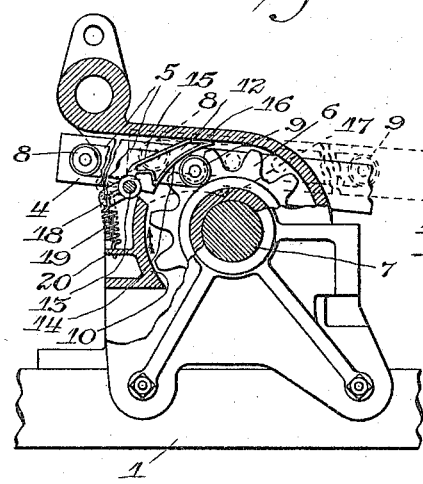
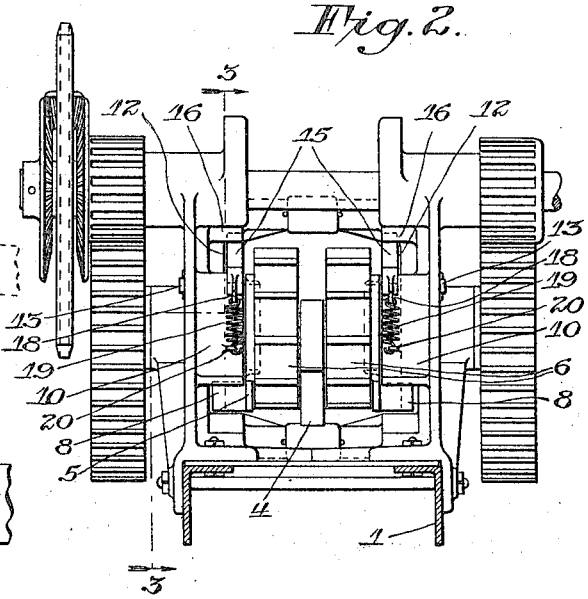
Inventor.
Thomas E. Turner,
By Chas. E. Lord
Atty.

UNITED STATES PATENT OFFICE.

THOMAS E. TURNER, OF SPRINGFIELD, OHIO, ASSIGNOR TO INTERNATIONAL HARVESTER COMPANY OF NEW JERSEY, A CORPORATION OF NEW JERSEY.

BALING-PRESS.

1,187,944. Specification of Letters Patent. Patented June 20, 1916.

Application filed July 23, 1915. Serial No. 41,496.

*To all whom it may concern:*

Be it known that I, THOMAS E. TURNER, a citizen of the United States, residing at Springfield, in the county of Clark and State of Ohio, have invented certain new and useful Improvements in Baling-Presses, of which the following is a full, clear, and exact specification.

My invention relates to baling presses, and especially to presses of the push power type, wherein the plunger is driven by a reciprocable rack member.

It has for its object to improve the construction of a press of that type in such a manner that the rack bar thereof may not move backward over its driving gears; as, for instance, when at the end of the compression stroke of the plunger a heavy load is put into the compression chamber. I attain this object by providing an improved normally operative latch or gate mechanism, depressible by the rack member, in which the latch or gate is automatically and instantaneously projected into such a position after passage of the rack member that the latter in such an objectionable backward movement engages therewith and is thereby deflected into a proper path.

In the accompanying drawings I have, for purposes of illustration, shown one embodiment which my invention may assume in practice.

In these drawings: Figure 1 is a side elevation of a press equipped with my improvement, certain parts of the driving mechanism being omitted to facilitate clearness of illustration; Fig. 2 is an end view of a press of the type shown in Fig. 1; Fig. 3 is a sectional view taken substantially on line 3—3 of Fig. 2.

The press shown is of the construction described and claimed in my copending application, Serial No. 827,827, filed March 28, 1914. It includes a frame 1 having a compression chamber 2 therein and a plunger 3 movable into and out of the chamber 2 and between suitable guides on the frame, by means of a rack member 4 which extends rearwardly from the plunger and has a rack surface 5 engageable with a plurality of rack gears 6. These gears are rotated by shafts 7 journaled on the frame 1 and driven through suitable slip clutch or differential driving mechanism of well-known construction, the rack member being successively withdrawn, elevated and projected as it passes under and over the rack gears and as the plunger 3 is moved back and forth. In this movement the rack member 4 is guided by rollers 8 and 9 upon the opposite ends of its rack portion. Of these rollers, the rollers 9 engage suitable curved guiding surfaces 10 on the frame, while the rollers 8 at the rearward end of the stroke engage upwardly and rearwardly extending cam members 11. Coöperating with these rollers 8 and 9 are latch members, or gate members, 12 pivoted at 13 to the frame. As usual, these members 12 have curved faces 14 adjacent the rollers 9 and forming continuations of the path of the guiding surfaces 10, and have also flat surfaces 15 engageable with the rollers 8 and forming a support therefor when the plunger is withdrawn (see Fig. 3), the rollers 8 then passing over the flat surfaces 15 and being supported thereon as the end of the rack bar passes toward its front position preparatory to again going under the pinions. As in the usual construction, the members 12 also engage and are limited in their upward movement by suitable ledges 16 on the frame 1 and in their lower positions repose in suitable notches 17 in the fixed part of the frame.

In my improvement the latch or gate members 12 are provided with tail portions 18 connected to coiled springs 19, which are in turn attached to rearwardly extending lugs 20 on the frame. These springs normally hold the members 12 in their uppermost position, shown in Fig. 1, wherein they form continuations of the surfaces 10 and their upper ends abut against the bottoms of the ledges 16. Obviously, when the rollers 9 pass upward they will engage the curved surface 14 of these members and continue in their usual path. Further, as the rack member 4 is withdrawn toward the right in passing over the rack gears 6, the rollers 8 will strike the top or flat surfaces 15 of the latches 12 and cause the same to be depressed into the position shown in Fig. 3, the free ends of the members 12 then being seated in their recesses or notches 17. As soon, however, as the rollers 8 have passed the members 12, these members, in my improved construction, instead of remaining seated in the notches 17, will swing upward and return instantaneously to their normal position shown in Fig. 1 and in full lines in Fig. 3, so that even should a heavy charge be placed in the chamber 2 and the rack member 4, as a result, start to move backward, its free end would not be able to pass out beyond the members 12.

It will be noted that in my improved construction an entirely new function is performed by the gate or latch members 12, the same acting to perform not only their ordinary functions; first, of forming a continuation of the surfaces 10 so that they may coöperate with the rollers 9, and second, of forming a riding surface for the rollers 8 as the rack bar is reciprocated, but also acting to prevent any return of the rack bar through an improper path, the same being instantaneously thrown up into position as soon as the rollers 8, in their forward movement, have passed them, in such a manner as normally to maintain the upper outlet for the rollers 8 closed and thereby prevent the abnormal or backward movement of the rack through that outlet.

While I have in this application specifically described one embodiment of my invention, it is to be understood that the latter is not limited to the embodiment shown herein for purposes of illustration, and may be modified and embodied in other forms without departing from its spirit.

What I claim as new is:

1. In a hay press, a frame having a compression chamber therein, a plunger movable in said chamber, a rack member connected to said plunger, rack driving gears carried on said frame, and means whereby upon delivery of a heavy charge into said chamber when said plunger is at the end of its compression stroke, said rack bar is held against a protracted backward movement.

2. In a hay press, a frame having a compression chamber therein, a plunger movable in said chamber, a rack bar attached to said plunger, rack gears carried on said frame, coöperating curved cam members carried on said frame engageable by said rack bar, said cam members having openings on opposite sides of the same through which said rack bar is movable, and means normally closing certain of said openings engageable by said rack bar and opened thereby.

3. In a hay press, a frame, a plunger movable thereon, a rack bar connected to said plunger, rack gears journaled on said frame and coöperating with said rack bar, rollers carried on said rack bar, coöperating cam members disposed eccentrically about the axis of said gears as a center, said cam members having a plurality of spaced openings therein on the opposite side of said rack gears from said plunger, gate members for certain of said openings engageable by said rollers, and means normally maintaining said gate members in closed position.

4. In a hay press, a frame, a plunger movable thereon, a rack bar connected to said plunger, rack gears journaled on said frame and coöperating with said rack bar, rollers carried on said rack bar, coöperating cam members having cam surfaces disposed concentrically about the axis of said gears as a center, said cam members having a plurality of openings therein on the opposite side of said rack gears from said plunger, gate members for certain of said openings engageable by said rollers, and resilient means normally maintaining said gate members in closed position.

5. In a hay press, a frame, a plunger movable thereon, a rack bar connected to said plunger, rack gears journaled on said frame and coöperating with said rack bar, rollers carried on said rack bar, coöperating cam members having cam surfaces disposed concentrically about the axis of said gears as a center, said cam members having a plurality of openings therein on the opposite side of said rack gears from said plunger, gate members for certain of said openings pivoted on said frame and engageable by said rollers, and coiled springs operatively connected to said frame and to said gate members at one side of their pivots normally maintaining them in closed position.

In testimony whereof I affix my signature.

THOMAS E. TURNER.

Copies of this patent may be obtained for five cents each, by addressing the "Commissioner of Patents Washington, D. C."